United States Patent [19]

Hinoshita et al.

[11] 3,860,871

[45] Jan. 14, 1975

[54] PHASE CONTROL SYSTEM FOR DEMODULATION CARRIER IN CARRIER BAND MULTILEVEL SIGNAL TRANSMISSION

[75] Inventors: Shigehiko Hinoshita, Yokohama; Shoji Hagiwara, Tokyo; Naohide Sata, Kokubunji, all of Japan

[73] Assignee: Fujitsu Limited, Kawasaki, Japan

[22] Filed: June 5, 1973

[21] Appl. No.: 367,170

[30] Foreign Application Priority Data

June 9, 1972 Japan .............................. 47-57514

[52] U.S. Cl. .............................. 325/38 B, 178/68

[51] Int. Cl. .............................. H04l 3/00

[58] Field of Search ............ 325/38 R, 38 A, 41, 42, 325/58, 49; 178/69 R, 69.5 R; 179/15 BS; 340/347 DD

[56] References Cited

UNITED STATES PATENTS

| | | | |
|---|---|---|---|
| 3,462,687 | 8/1969 | Becker et al. | 325/42 |
| 3,654,492 | 4/1972 | Clark | 178/69.5 R |
| 3,761,818 | 9/1973 | Tazaki et al. | 325/38 A |

*Primary Examiner*—Benedict V. Safourek
*Attorney, Agent, or Firm*—Daniel Jay Tick

[57] ABSTRACT

In narrow band transmission by BSB and VSB modulation, phase distortion due to the transmission line occurs in the carrier signal, followed by a phase shift from accurate pulse response of the multilevel signal demodulated by the carrier signal subjected to the line phase distortion. A reference level signal having a predetermined level lower than the multilevel signal is inserted at a specified interval into the multilevel signal train to be transmitted. The intersymbol interference of the reference level signal is detected at the receiver, so that the phase shift from the accurate response of the multilevel signal is compensated by controlling the phase of the demodulation carrier signal to be supplied to the demodulator.

4 Claims, 9 Drawing Figures

PHASE SHIFTER 514

PHASE CONTROL SYSTEM FOR DEMODULATION CARRIER IN CARRIER BAND MULTILEVEL SIGNAL TRANSMISSION

BACKGROUND OF THE INVENTION

The present invention relates to a phase control system. More particularly, the invention relates to a phase control system for the demodulation carrier in a carrier band multilevel signal transmission.

When it is possible to use a comparatively high quality transmission line in order to obtain efficient transmission of a digital signal, the signal to be transmitted is transmitted as a multilevel signal with a view to narrowing the bandwidth for signal transmission. In such multilevel signal transmission, the transmitted pulses are permitted to take only one level from among the number of predetermined P amplitude levels. This means that the information of $\log_2 P$ bits is transmitted by only one pulse. The multilevel signal transmission system, typical of the band-suppressed transmission system, primarily requires accurate pulse amplitude transmission. However, technical difficulty in the transmission of amplitude level without error increases with an increase in the number of multilevels P. In other words, the received demodulated waveform is greatly deformed by linear distortions such as amplitude distortion and phase distortion on the transmission line. This causes drastic deterioration of the eye pattern of the received demodulated waveform and an increase of the error rate during regeneration, as compared with that of two level signal transmission. Meanwhile, when a multilevel signal is transmitted within the carrier bandwidth, the demodulation carrier signal obtained from the received signal is supplied to the demodulator at the receiver for carrying out demodulation.

In the aforedescribed case, since the carrier signal is phase distorted by the transmission line, the multilevel signal demodulated by such carrier signal is also phase distorted on the transmission line. Therefore, in order to reduce the distortion resulting from the transmission line, generally, an automatic equalizer is provided at the receiver. Thus, intersymbol interference of the demodulated multilevel signal is detected and the equalization rate is controlled by the degree of intersymbol interference.

However, normal operation of an equalizer of this type does not permit great distortion or intersymbol interference for the eye opening of the multilevel signal, but requires too large an eye to be closed by a little waveform distortion or intersymbol interference. In addition, it includes the following problem. If the number of levels are reduced as a result of providing a large eye, the transmission rate of the information is degraded by the narrowed pull-in range of the equalizer.

An object of the invention is to provide a phase control system for the demodulation carrier in a carrier band multilevel signal transmission.

Another object of the invention is to provide a phase control system for compensating for distortion on a transmission line by controlling the phase of the demodulation carrier with reference to the detection output of the intersymbol interference of the modulated multilevel signal.

Still another object of the invention is to provide a phase control system for enlarging the pull-in range for detecting intersymbol interference by inserting a predetermined reference level at predetermined intervals into the multilevel signal to be transmitted.

Yet another object of the invention is to provide a system for detecting the intersymbol interference resulting from distortion on the transmission line with regard to a predetermined reference level signal and to compensate for phase distortion of the demodulated multilevel signal caused by phase distortion of the demodulation carrier by controlling the phase of the demodulation carrier so that the detected intersymbol interference may be reduced.

Another object of the invention is to provide a system for detecting the intersymbol interference between the reference level signal inserted at the receiver at predetermined intervals into the multilevel signal in the demodulation signal waveform and the multilevel signal pulses of required numbers around the reference level signal.

Still another object of the invention is to provide a system for controlling the phase of the demodulation carrier in order to reduce the phase error of the demodulation carrier obtained at the receiver from correlations of pulse polarity and pulse amplitude error between the reference level signal inserted at predetermined intervals into the multilevel signal in the demodulation signal waveform and the multilevel signal in the vicinity of the reference signal.

BRIEF SUMMARY OF THE INVENTION

The phase control system of the invention inserts a reference level signal having predetermined multilevels lower than the number of levels of the multilevel signal at predetermined intervals into the multilevel signal train at the transmitter. At the receiver, the phase synchronization error of the demodulation carrier is obtained from intersymbol interference between the reference level signal in the demodulation signal waveform and the multilevel signal pulses of specified numbers in the vicinity of the reference level signal. The phase of the demodulation carrier is controlled so that the intersymbol interference is reduced.

The multilevel signal transmission system of the invention is for transmitting a signal via a transmission line.

A transmitter is connected to one end of the transmission line, said transmitter including means for inserting a reference level signal into a multilevel signal at predetermined intervals, the reference level signal having a lower level than the multilevel signal, and means for transmitting the multilevel signals and the reference level signals to the transmission line by carrier band.

A receiver is connected to the other end of the transmission line for receiving transmitted signals. The receiving means includes demodulating means for demodulating the received transmitted signals and derives a demodulation carrier therefrom, means for detecting intersymbol interference between the reference level signal and preceding and succeeding multilevel signals, and means coupled between the detecting means and the demodulating means for controlling the phase of the demodulation carrier derived from the received signal by the demodulating means in accordance with the intersymbol interference.

The multilevel signal transmission system includes detecting means of the receiving means to detect intersymbol interference between the reference level signal and adjacent multilevel signals.

The multilevel signal transmission system of the invention has receiving means which comprise carrier regenerating means for regenerating a demodulation carrier from the received transmitted signals. The regenerating means has an output, shifting means connected to the output of the regenerating means for shifting the phase of the carrier provided by the regenerating means. The shifting means has inputs and an output, and demodulating means connected to the output of the shifting means for demodulating the received transmitted signals in accordance with the carrier output of the shifting means. The demodulating means has an output, converting means connected to the output of the demodulating means for converting demodulated signals produced by the demodulating means to digital signals. The converting means provides polarity bits and has an output, and control means connected between the output of the converting means and an input of the shifting means for providing a control signal for controlling the shifting operation of the shifting means in accordance with polarity bits provided by the converting means.

The multilevel signal transmission system has control means which comprise delay means having an input connected to the output of the converting means and an output for delaying the polarity bits providing by the converting means, exclusive OR means connected between the input and the output of the delay means for providing exclusive OR gating of the input and output of the delay means, the OR means having outputs, and coupling means coupling the outputs of the exclusive OR means to the input of the shifting means.

BRIEF DESCRIPTION OF THE DRAWINGS

In the FIGS., the same components are identified by the same reference numerals.

DETAILED DESCRIPTION OF THE INVENTION

Usually, a digital signal is transmitted in the form of a multilevel signal, in order to obtain highly efficient transmission with a narrow bandwidth.

Figure 1:
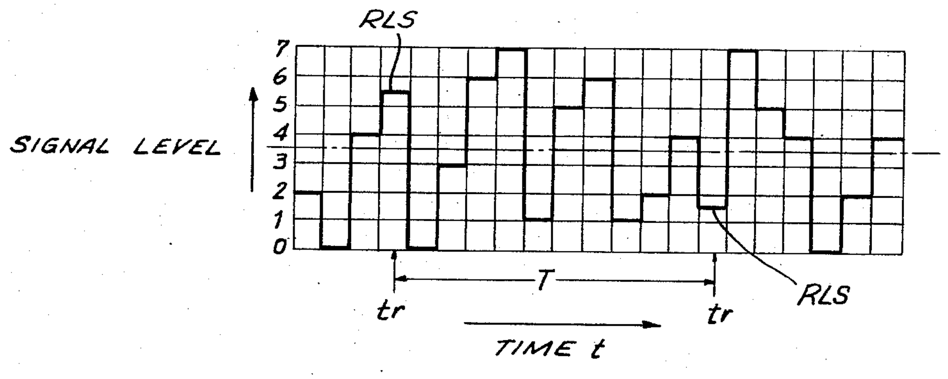
FIG. 1 is a graphical presentation of an eight level signal to be transmitted by a transmission system related to the invention.

FIG. 1 shows an example of a multilevel signal to be transmitted, which is an eight level signal in the example of FIG. 1. In FIG. 1, the ordinate represents the signal level and the abscissa represents time. In FIG. 1, RLS represents the reference level signal, inserted in accordance with the invention.

Generally, the levels of the multilevel signal to be transmitted are produced at random. The reference level signal of, for example, two levels, is inserted into the multilevel signal at every predetermined interval T. This reference level signal is transmitted to the receiver by the modulation of the carrier by the multilevel signal. Since the received signal, at such time, is distorted by the transmission line, the multilevel signal demodulated by the demodulation carrier obtained from the received signal is also distorted by the transmission line. Because of deformation of the demodulated waveform due to distortion by the transmission line, the eye pattern is prepared in order to see whether or not it is possible to identify the multilevel.

Figure 2:
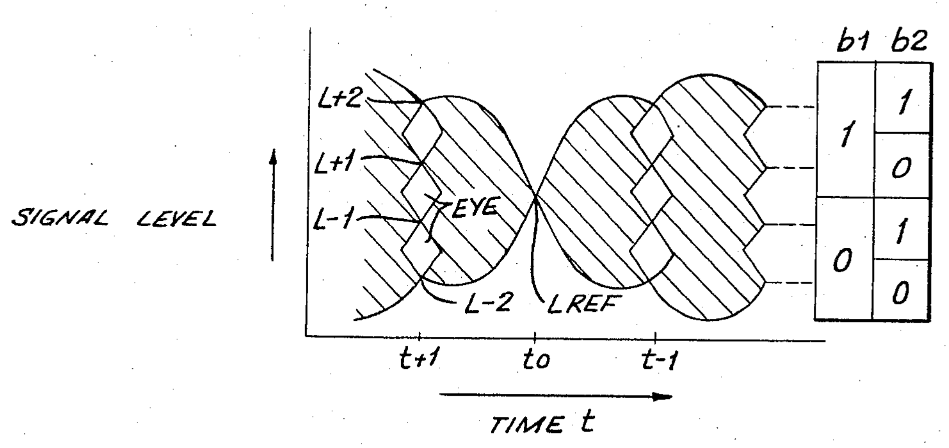
FIG. 2 is a graphical presentation of an idealistic eye pattern of a multilevel signal received and demodulated at the receiver, when a four level signal is transmitted.

FIG. 2 shows an idealistic eye pattern where a reference level signal of one level is inserted into the four level signal. In FIG. 2, the abscissa represents time and the ordinate represents the signal level. In FIG. 2, L−2, L−1, L+1 and L+2 respectively show the levels of the four level signal, LREF shows the level of the reference level signal RLS, and EYE represents the eye opening of the eye pattern. If the reference level signal RLS is received at the time to, any of four levels may be arbitrarily selected at the time $t+1$ or $t-1$.

In the idealistic case where the demodulation multilevel signal is not distorted, the received waveform must be the demodulation waveform which passes any one of the levels L−2, L−1, L+1 and L+2 at the time $t+1$ and $t-1$, and the level LREF at the time to. For this reason, the area where no demodulation multilevel signal exists, that is, the EYE, is observed in the vicinity of the level point. The shaded area in FIG. 2 represents the area where the demodulated signal waveform exists without fail.

The eye opening EYE is a must for identifying the multilevel from the demodulated signal waveform. That is, the threshold level is determined at the interim point of the eye opening EYE. The level identification, whether or not it is the level L−2 or L−1, is carried out with reference to the threshold level. In FIG. 2, the level LREF of the reference level signal, inserted in accordance with the invention, is selected at the center of the multilevel L−1 and L+1. Although the present example is further described hereinafter, the invention is not restricted to such example, only.

Figure 3:
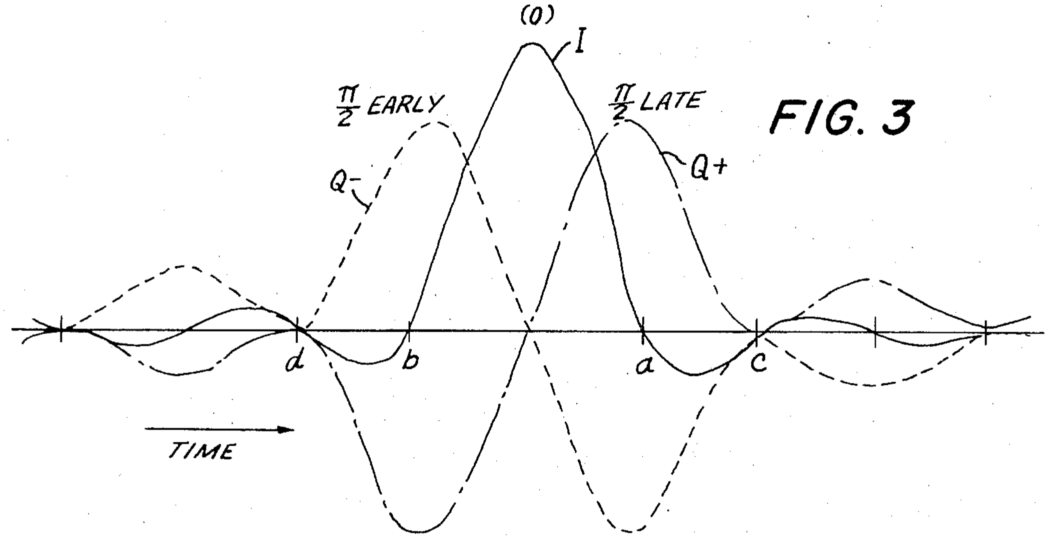
FIG. 3 is a graphical presentation explaining the demodulation waveform and the carrier phase error.

Demodulated waveform distortion resulting from the carrier phase shift is described with regard to FIG. 3. A signal demodulated by a carrier having a specific phase shift takes a demodulated waveform such as, for example, I and Q, respectively, having a phase shifted 90° from the accurate pulse phase shown in FIG. 3, for example. Therefore, as shown in FIG. 3, the largest distortion appears at the points $a$ and $b$, ± time slot apart from the noted pulse, causing odd symmetry relative to such pulse. At the same time, no distortion variation is observed at the points $c$ and $d$, ±2 time slots apart, despite variations of the carrier phase.

Therefore, when the waveform I becomes almost odd in symmetry relative to the waveform Q, as shown in FIG. 3, the intersymbol interference at the time slots adjacent the noted pulse may result from the carrier phase error. It thus suffices to control the carrier phase so that the odd symmetry component of the waveform Q is eliminated. It is apparently possible to increase the sensitivity or certainty by detecting almost odd symmetry components at positive or negative odd numbered time slots, or no distortion at positive or negative numbered time slots, as well as error at the ±1 time slots.

It has heretofore, been thought that the phase error may be detected by the pulse and intersymbol interference caused at some positive or negative time slots by the pulse. On the contrary, however, it may easily be understood from FIG. 3 that the phase error may be detected from the intersymbol interference affected at a specific pulse and time slot relative to the pulses in time slots adjacent to the specific pulse. The inventors have thus discovered that intersymbol interference may easily be detected by using the reference level signal as a specific pulse.

An application example of the invention is explained with reference to FIG. 4. The phase control system of FIG. 4 comprises a transmitter S, a receiver R and a transmission line L. The transmitter S has an input terminal IN, to which a series digital signal is applied. A binary-multilevel converter 41 converts the input digital signal into a multilevel signal, in accordance with a clock signal from a clock signal generator 42. This, however, is not part of the invention and has already been disclosed, from a technical point of view. Its principle of operation may be considered similar to that of digital to analog converter which converts a series digital signal into an analog signal.

The multilevel signal MLS is written into a buffer register 43 and a reference level signal RLS is inserted at predetermined intervals under the control of a control circuit 44 to obtain the signal shown in FIG. 1.

Figure 5A:
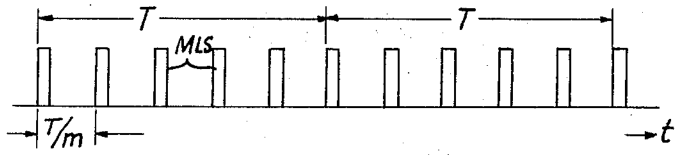
FIGS. 5A and 5B are graphical presentations explaining the insertion of the reference level signal at the transmitter.
Figure 5B:
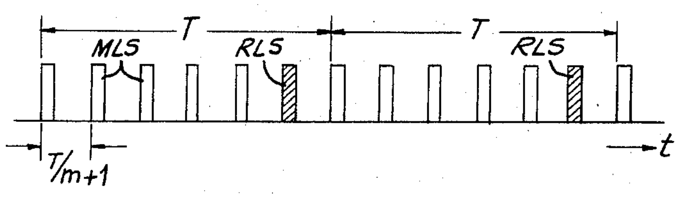

FIG. 5A shows a multilevel signal. FIG. 5B shows where the reference level signal RLS is inserted.

Figure 6:
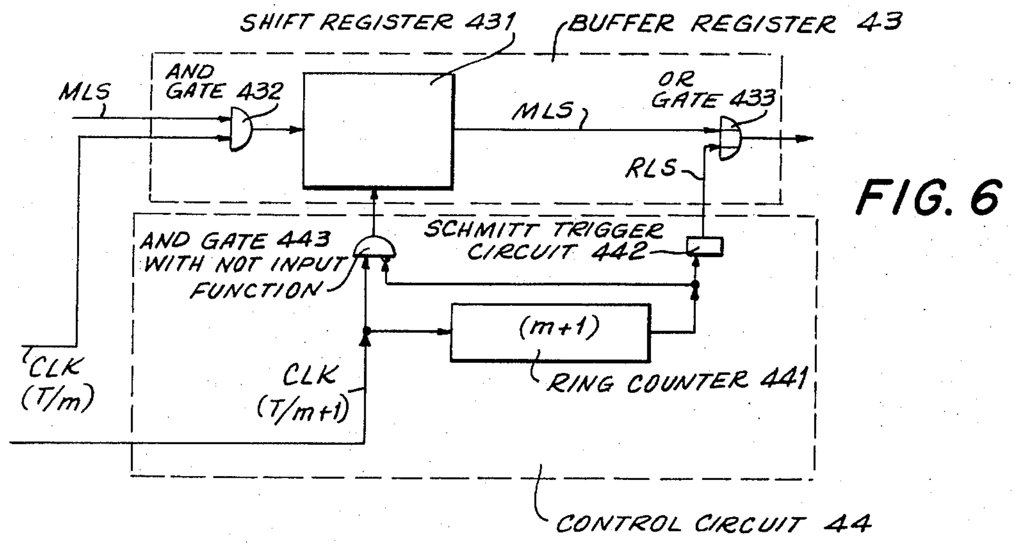
FIG. 6 is a block diagram of an embodiment of the buffer register and control circuit of FIG. 4 for inserting the reference signal.
Figure 4:
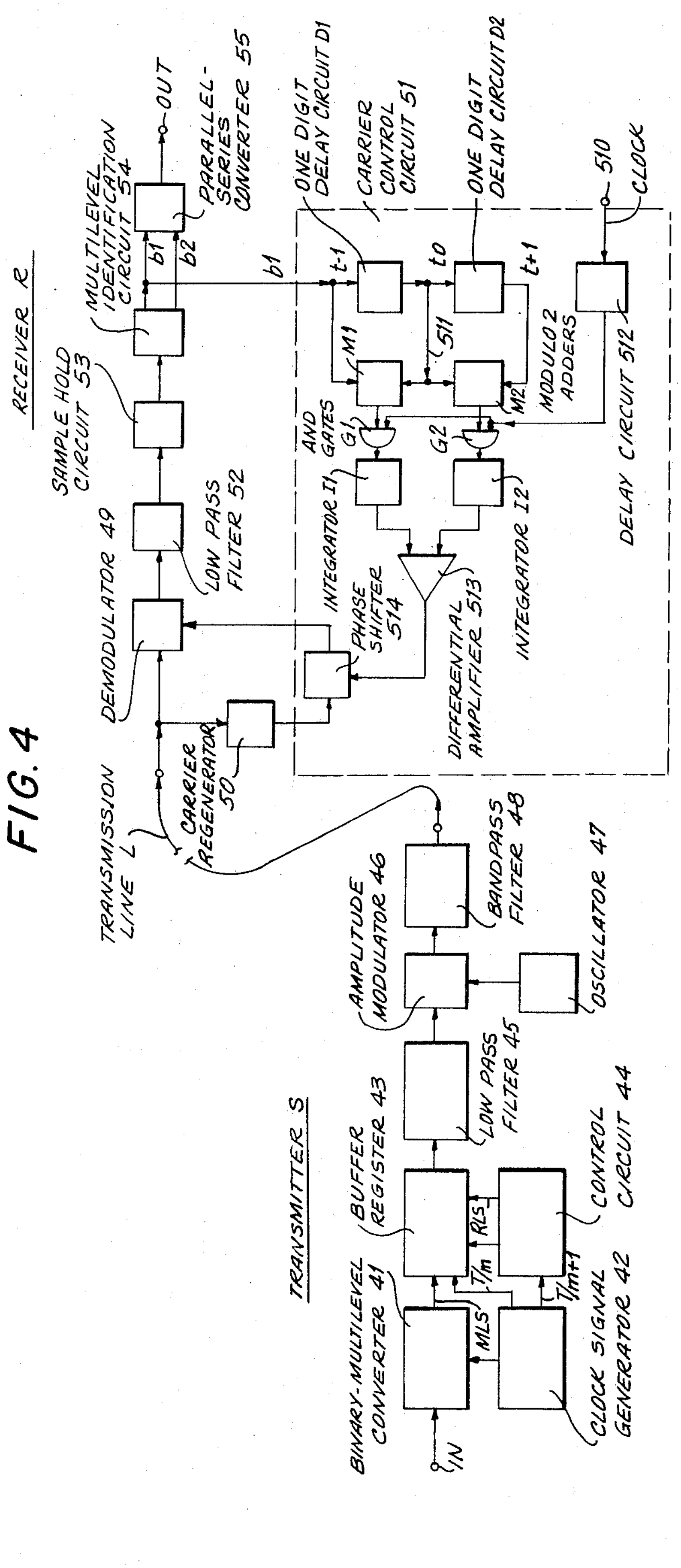
FIG. 4 is a block diagram of an embodiment of the phase control system of the invention.

FIG. 6 shows a buffer register 43 and a control circuit 44 which may be utilized as such in the system of FIG. 4. In FIGS. 5A, 5B and 6, RLS represents a two level reference level signal, inserted in accordance with the invention. MLS is the multilevel signal to be transmitted. CLK is the clock signal. T is a predetermined insertion period of the reference level signal. *m* is arbitrary integer.

The buffer register 43 comprises a shift register 431 and the control circuit 44 comprises a ring counter 441 which counts *m*+1. The multilevel signal MLS and the clock signal CLK are fed to the shift register via an AND gate 432. The clock signal CLK is supplied to the input of the ring counter 441 and to an input of an AND gate 443 with a NOT input function. The output of the ring counter 441 is supplied to the other input of the AND gate 443 and to the input of a Schmitt trigger circuit 442. The output of the shift register 431 is supplied to one input of an OR gate 433 and the output of the Schmitt trigger circuit 442 is supplied to the other input of the OR gate 433. The output of the OR gate 433 is the output of the buffer register 43.

As shown in FIGS. 5A, 5B and 6, the multilevel signal MLS is written in the shift register 431 of the buffer register 43 via the AND gate 432 by the clock signal CLK. The clock signal CLK has a repetition frequency T/*m* and is supplied from the clock circuit 42. *m* multilevel signals MLS written into the shift register 431 are read out by a clock signal CLK having a repetition frequency T/*m*+1, supplied via the AND gate 443, except when readout is blocked by the ring counter 441. In other words, readout of the multilevel signal MLS is blocked, as shown in FIG. 5B, once in the repetition frequency T, during the time T/*m*+1 while the carry output of the ring counter 441 appears. During the blocking time T/*m*+1, the reference level signal RLS is produced by the Schmitt trigger circuit 442 and appears via the OR gate 433.

As shown in FIG. 4, the multilevel signal including the reference level signal, obtained as hereinbefore mentioned, is filtered and passed by a low pass filter 45 in the transmitter and amplitude modulates the carrier supplied from an oscillator 47 in an amplitude modulator 46. The modulated signal is then transmitted to the transmission line L after undertaking band suppression by a bandpass filter 48.

At the receiver R, the multilevel signal in the carrier band is demodulated by a demodulator 49. At such time, however, the demodulation carrier is regenerated by a carrier regenerator 50. The carrier regenerator 50 may comprise a narrow bandpass filter for the carrier frequency. If the regenerated carrier 50 has a phase error, the waveform distortion or intersymbol interference occurs as hereinbefore mentioned, causing a multilevel identification error. Therefore, the phase error must be eliminated. A carrier control circuit 51 is provided for in FIG. 4 for the purpose of eliminating the phase error. The carrier control circuit 51 is added, in accordance with the invention.

The demodulation signal is filtered at its higher sideband by a low pass filter 52 of the receiver, leaving only the lower sideband. The lower sideband undergoes multilevel identification at a sample hold circuit 53 and a multilevel identification circuit 54, and is in turn converted into a digital signal. The parallel output signal of the multilevel identification circuit 54 is converted into a series signal by a parallel-series converted 55 and is supplied to an output terminal OUT after losing the reference level signal.

Of the parallel signals supplied to the output terminal OUT, the polarity identification bit *b*1 of the two bit digital signal relative to the single multilevel signal, demodulated in accordance with the symbol chart shown at the right hand side of FIG. 2, is led to the carrier control circuit 51, and is supplied to a one digit delay circuit D1, a one digit delay circuit D2 and to modulo 2 adders or exclusive OR gates M1 and M2. A clock signal produced at the same interval as the reference level signal is supplied to a terminal 510 and is supplied to a pair of AND gates G1 and G2 via a delay circuit 512. The clock signal supplied to the terminal 510 and the reference level signal appearing on a line 511 are thus matched in the carrier control circuit 51. Therefore, the level 1 appears at the output signal only when the polarity of each reference level signal supplied from the modulo 2 adders M1 and M2 via the AND gates G1 and G2 differs from that of the preceding and succeeding signal thereof.

As is clear from the foregoing explanation, the correlation between the polarity of the preceding and succeeding pulse of the reference level signal resulting from the carrier phase error and the polarity of the error of the reference level signal may be obtained in accordance with the theory explained with regard to FIG. 3. Whether or not the phase error should be corrected and how it should be corrected are determined in accordance with such correlation value. A detailed explanation is provided with regard to FIG. 7.

Figure 7:
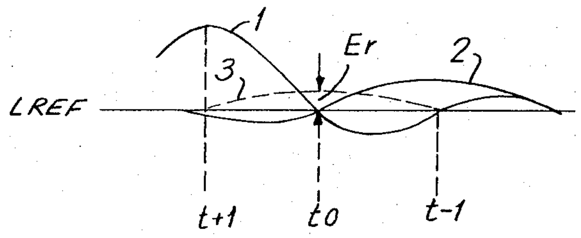
FIG. 7 is a graphical presentation of an algorithm of the phase control of the carrier signal in the phase control system of the invention.

FIG. 7 shows an instantaneous state of the eye pattern shown in FIG. 2. The waveforms 1 and 2 of FIG. 7 are both demodulated multilevel signals. The waveform 3 is the reference level signal. Intrinsically, the reference level signal 3 must be at the level LREF, because it is demodulated by a carrier having phase distortion. In this case, however, it is shifted somewhat from the level LREF due to the orthogonal component of the preceding and succeeding multilevel signal. The level Er thus indicates the extent of the error relative to the reference level signal.

Each polarity bit *b*1 is expressed by "1" or "0". Whether the error of the reference level signal is higher or lower than the level LREF and whether the phase distortion of the demodulation carrier is early or late is summarized in the following Table I from the explanation regarding FIG. 3.

TABLE I

| Polarity of reference level signal | 1 | | 0 | |
|---|---|---|---|---|
| Polarity of multilevel signal at time $t+1$ | 0 | 1 | 1 | 0 |
| Polarity of multilevel signal at time $t-1$ | 1 | 0 | 0 | 1 |
| Phase distortion of demodulation carrier | EARLY | LATE | EARLY | LATE |

As indicated in Table I, when there is an output from the AND gaate G2, the carrier is early and when there is an output from the AND gate G1, the carrier is late. Therefore, if the outputs from the AND gates G1 and G2 are respectively supplied to integrators I1 and I2, integral voltages proportional to the output time of the modulo 2 adders M1 and M2 are obtained. Furthermore, the application of these voltages to a differential amplifier 513, which provides the voltage difference, determines in which direction phase control by a phase shifter 514 of the carrier from the carrier regenerator 50 should be provided. The determination is made according to the polarity of the difference signal.

Figure 8:
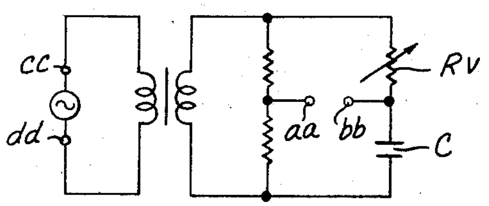
FIG. 8 PRIOR ART
FIG. 8 is a circuit diagram of an embodiment of a phase shifter which may be utilized in the phase control system of the invention, as shown in FIG. 4.

The phase shifter 514 may comprise any suitable or well known phase shifter such as, for example, that shown in FIG. 8. In the phase shifter of FIG. 8, the carrier signal from the carrier regenerator 50 is supplied to terminals *cc* and *dd*. The phase controlled demodulation carrier is derived from terminals *aa* and *bb*. In the circuit of FIG. 8, the phase control of the carrier is carried out as follows. A variable resistor Rv is connected in series with a capacitor C and the series circuit Rv, C is controlled in accordance with the output of the differential amplifier 513.

The correlation circuit comprising the delay circuits D1 and D2, the modulo 2 adders M1 and M2, and the integrators I1 and I2 may be replaced by an automatic equalizer, if required, More particularly, when each of the delay circuits D1 and D2 has a delay time of one digit in the circuit of FIG. 4, the correlation is beween the reference level signal and the multilevel signals in its vicinity.

The phase control system of the invention permits the consideration of the algorism taking the correlation between the reference level signal and not only the adjacent multilevel signals, but also the preceding and succeeding multilevel signals in a wider range, by increasing the delay circuits of such phase control system.

While the invention has been described by means of a specific example and in a specific embodiment, we do not wish to be limited thereto, for obvious modifications will occur to those skilled in the art without departing from the spirit and scope of the invention.

We claim:

1. A multilevel signal transmission system for transmitting a signal via a transmission line, said transmission system comprising transmitting means connected to one end of the transmission line, said transmitting means including means for inserting a reference level signal into a multilevel signal at predetermined intervals, the reference level signal having a lower level than the multilevel signal, and means for transmitting the multilevel signals and the reference level signals to the transmission line by carrier band; and receiving means connected to the other end of the transmission line for receiving transmitted signals, said receiving means included demodulating means for demodulating the received transmitted signals and deriving a demodulation carrier therefrom, said demodulating means including a demodulator producing a demodulated signal, means for detecting intersymbol interference which is used as a control signal between the reference level signal and adjacent multilevel signals from the demodulated signal of the demodulator, and means coupled between the detecting means and the demodulating means for controlling the phase of the demodulation carrier derived from the received signal by the demodulating means at the demodulator in accordance with the intersymbol interference.

2. A multilevel signal transmission system as claimed in claim 1, wherein the detecting means of the receiving means detects intersymbol interference between the reference level signal and preceding and succeeding multilevel signals.

3. A multilevel signal transmission system as claimed in claim 1, wherein the receiving means comprises carrier regenerating means for regenerating a demodulation carrier from the received transmitted signals, said regenerating means having an output, shifting means connected to the output of the regenerating means for shifting the phase of the carrier provided by the regenerating means, said shifting means having inputs and an output, demodulating means connected to the output of the shifting means for demodulating the received transmitted signals in accordance with the carrier output of the shifting means, said demodulating means having an output, converting means connected to the output of the demodulating means for converting demodulated signals produced by the demodulating means to digital signals, said converting means providing polarity bits and having an output, and control means connected between the output of the converting means and an input of the shifting means for providing a control signal for controlling the shifting operation of the shifting means in accordance with polarity bits provided by the converting means.

4. A multilevel signal transmission system as claimed in claim 3, wherein the control means comprises delay means having an input connected to the output of the converting means and an output for delaying the polarity bits provided by the converting means, exclusive OR means connected between the input and the output of the delay means for providing exclusive OR gating of the input and output of the delay means, said OR means having outputs, and coupling means coupling the outputs of the exclusive OR means to said input of the shifting means.

* * * * *

UNITED STATES PATENT OFFICE
CERTIFICATE OF CORRECTION

Patent No. 3,860,871 Dated January 14, 1975

Inventor(s) Shigehiko Hinoshita et al.

It is certified that error appears in the above-identified patent and that said Letters Patent are hereby corrected as shown below:

On the Cover Sheet, in item [75] the following name should be added:

-- Takashi Miyagawa, Ishikawa-Ken --

Signed and sealed this 24th day of June 1975.

(SEAL)
Attest:

RUTH C. MASON
Attesting Officer

C. MARSHALL DANN
Commissioner of Patents and Trademarks